Aug. 13, 1940.  I. SERRURIER  2,211,218
FILM VIEWING DEVICE
Filed Nov. 10, 1937  3 Sheets-Sheet 1
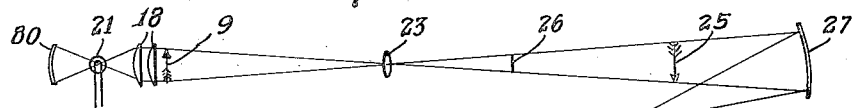
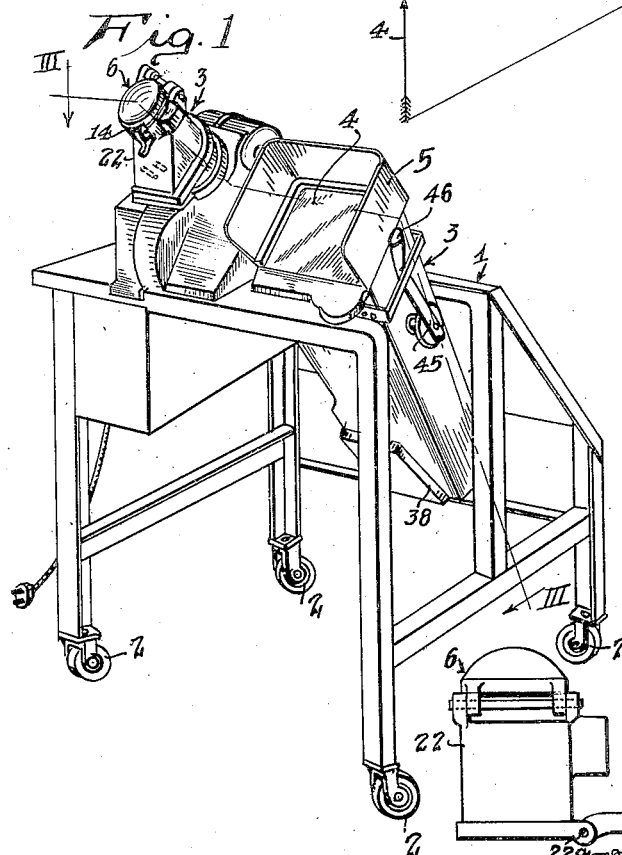
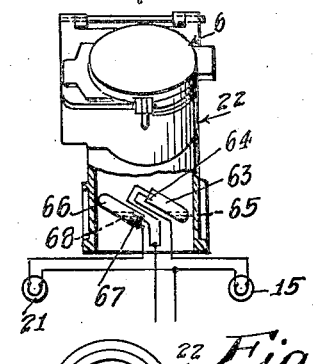
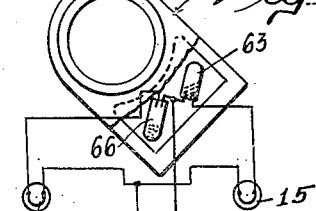
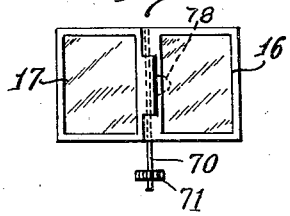
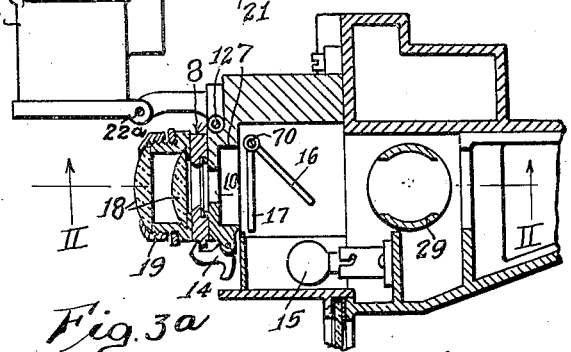
Inventor
Iwan Serrurier
By Lyon & Lyon
Attorneys

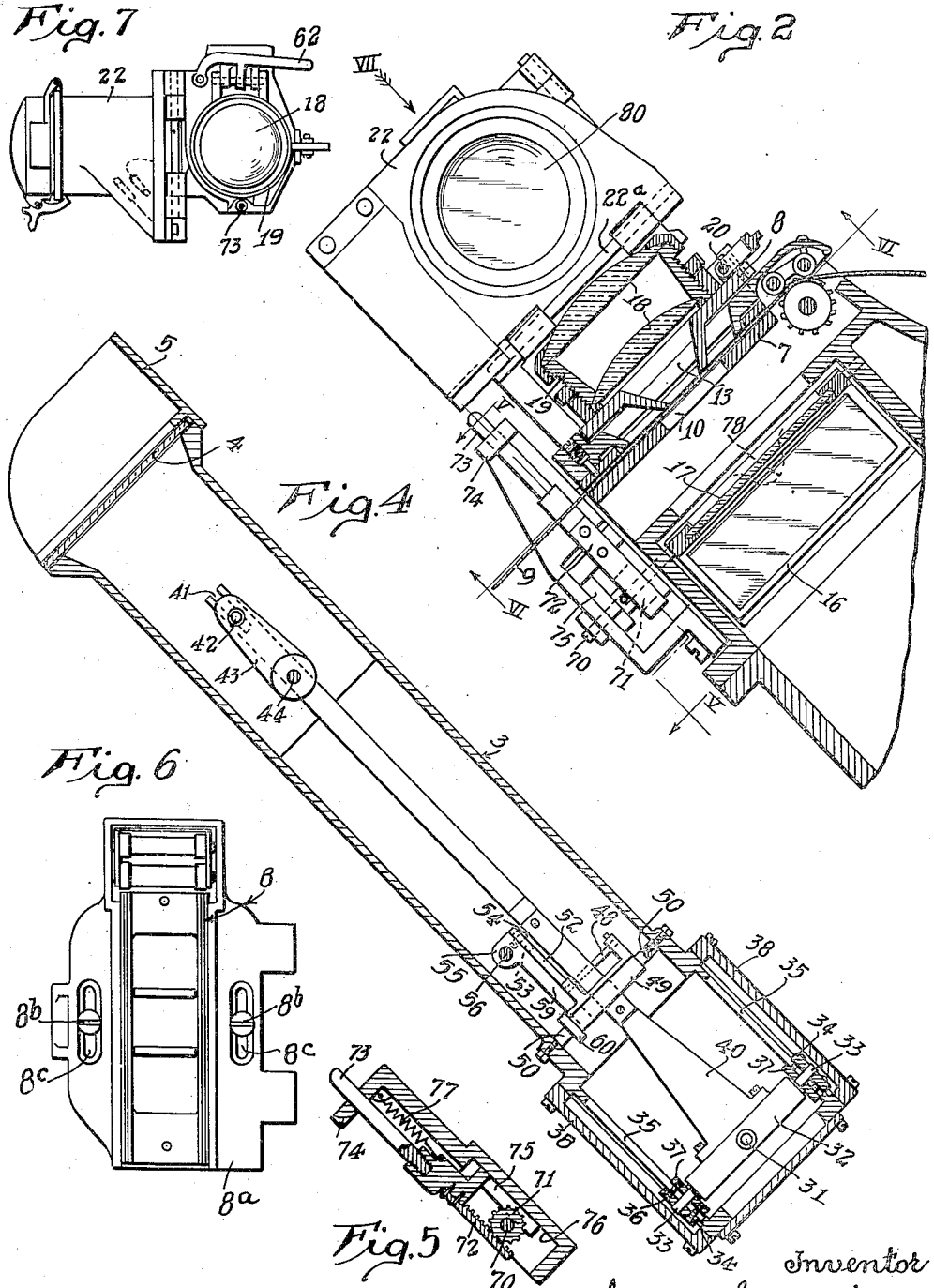

Aug. 13, 1940.  I. SERRURIER  2,211,218
FILM VIEWING DEVICE
Filed Nov. 10, 1937  3 Sheets-Sheet 3
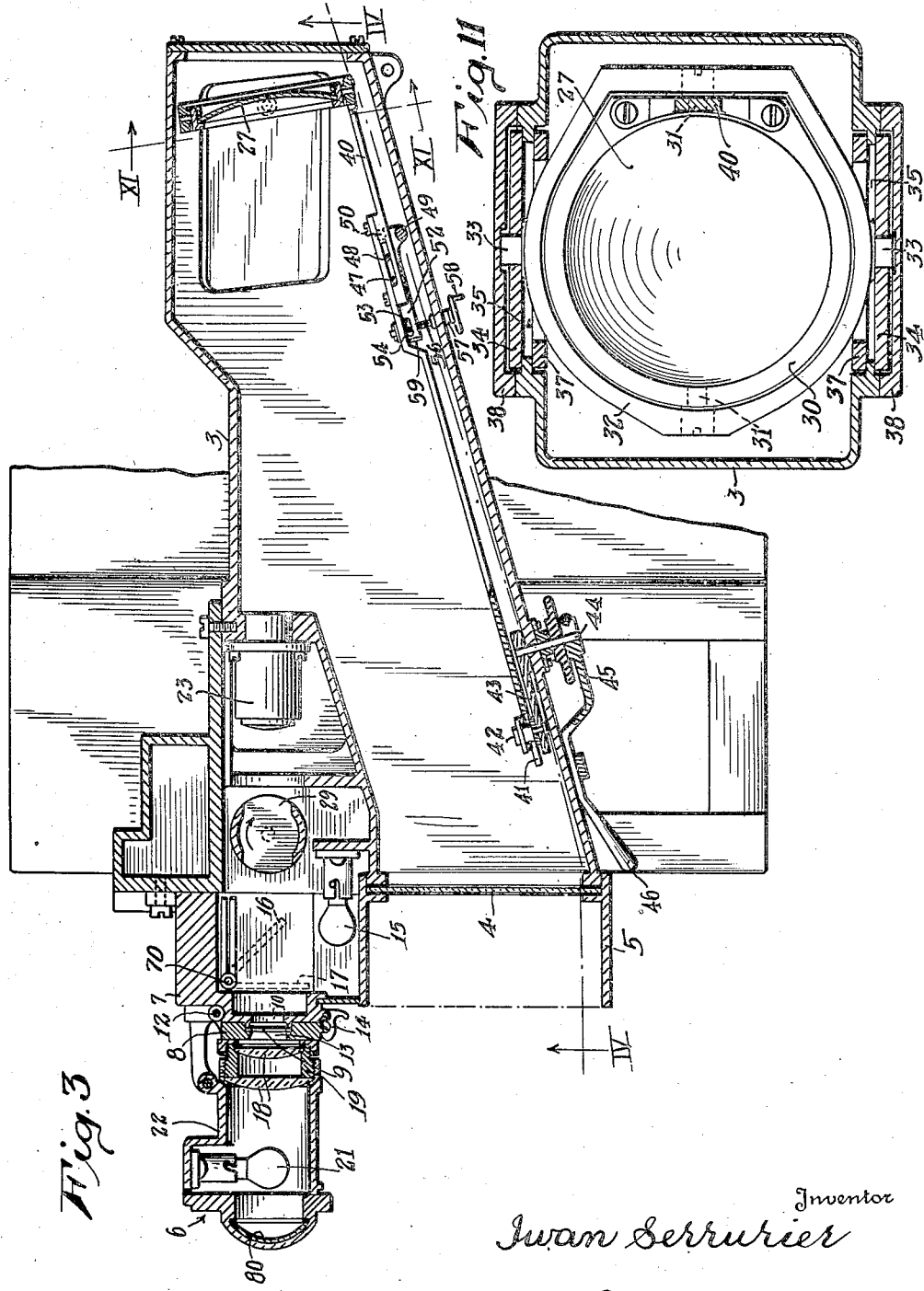
Inventor
Iwan Serrurier
By Lyon & Lyon
Attorneys Patented Aug. 13, 1940

2,211,218

UNITED STATES PATENT OFFICE 2,211,218

FILM VIEWING DEVICE

Iwan Serrurier, Los Angeles, Calif.

Application November 10, 1937, Serial No. 173,813

11 Claims. (Cl. 88—14)

This invention relates to devices for viewing transparencies, particularly motion picture films, and has special utility in the editing of motion picture films.

A broad object of the invention is to provide a film viewing machine in which the operator may view the film directly through a magnifying lens, or may, at his option, view an enlarged projected image of the film on a screen.

A more specific object is to provide a combination direct viewing and projecting machine in which a changeover from one combination to the other can be quickly and easily accomplished, and in which the projected image is erect with respect to the film, both horizontally and vertically.

Various other more specific objects and features of the invention will become apparent from the detailed description which follows:

For editing films there is in extensive use a film viewing machine in which the film is moved longitudinally past an aperture illuminated from the rear, the illuminated film being viewed directly by the operator. To produce a larger, clearer image it is customary to insert a simple magnifying lens in front of the film to increase the apparent size of the image seen. These machines have the great advantage, for editing purposes, that the film being viewed directly with the picture in an erect position, is conveniently positioned and supported for direct inspection and for the making thereon of identifying marks. Furthermore, the machines are very compact, requiring no screen; can be used in lighted rooms, and can run the film either forward or backward.

However, it is frequently desirable to view a larger image of the scene than is provided by the magnifying lens of the machines of the type described and special projectors have been developed for this use. The ordinary projector, however, has numerous disadvantages, particularly when used in combination with a direct viewing machine. Thus the cutting room in which the direct viewing machines are employed is not darkened and since the ordinary projection on the screen must be carried on in a darkened room, it becomes necessary, when it is desired to project the film, to interrupt the work in the cutting room, take it from the direct viewing machine, and transfer it to the projector in a darkened projection room. Furthermore, it is very difficult to mark a film being run through a projector because the film is harder to get at and runs vertically downward with the picture on the film upside down, whereas in the direct viewing machine the film moves upwardly with the pictures in erect position.

In accordance with the present invention, I combine most of the advantageous features of the direct viewing and projection type of machines while eliminating their important defects, by providing a single machine in which the film is run upwardly, with the pictures thereon in erect position, with provision made for either direct viewing of the film in the customary manner by illuminating it from the rear and observing it through a magnifying glass, or by projecting on a screen an enlarged image of the film, the film remaining in the same position and its movement being unaffected by the changes necessary to convert the machine from the direct viewing condition to the image projecting condition.

The invention will now be explained by describing in detail, with reference to the drawings, a specific embodiment thereof, it being understood that various departures from the particular structure shown may be made without departing from the invention.

In the drawings:

Fig. 1 is a perspective view of a complete film viewing machine in accordance with the invention.

Fig. 2 is a detail vertical sectional view taken approximately in the plane II—II of Fig. 3a.

Fig. 3 is a longitudinal sectional view, taken approximately in the plane III—III of Fig. 1.

Fig. 3a is a longitudinal section taken in the same plane as Fig. 3, showing a portion of the apparatus in a different position of adjustment.

Fig. 4 is a sectional view taken approximately in the plane IV—IV of Fig. 3.

Fig. 5 is a detail section taken approximately in the plane V—V of Fig. 2.

Fig. 6 is a cross section taken in the plane VI—VI of Fig. 2.

Fig. 7 is a view of a portion of the machine, looking in the direction of the arrow VII in Fig. 2.

Fig. 8 is a detail view illustrating the construction of a mirror and transparency employed in the machine.

Fig. 9 is a front elevation view of the lamp housing of the machine in normal position with a portion of the front wall broken away to show the switches.

Fig. 10 is an elevation view, similar to Fig. 9, but with the lamp housing in open position to show the different positions of the switches.

Fig. 11 is a section taken in the plane XI—XI of Fig. 3.

Fig. 12 is a schematic diagram illustrating the optical system employed in the machine.

Referring first to Fig. 1, the film viewing machine there disclosed comprises a supporting frame 1 which may be mounted on casters 2 for easy movement, and the film viewing mechanism proper, which is supported on the frame. The viewing mechanism comprises an elongated housing 3 which is light-tight and relatively wide at the top but tapers to a narrower width at the lower end. At the upper end of the housing 3, and on the right side thereof, is a translucent viewing screen 4 which may be a ground glass, on which a picture is adapted to be projected. To shield the screen 4 from extraneous light, to a limited extent, at least, the screen is partly enclosed in a hood 5 which extends across the top and down the sides of the screen. Also positioned on the upper end of the housing 3, but to one side of the screen 4, is the film feeding and direct viewing mechanism 6.

Referring to Figs. 2 and 3, the apparatus 6 comprises a stationary aperture member 7 and a hinged aperture member 8 between which the film 9 to be viewed passes, the two members 7 and 8 having juxtaposed recesses therein provided with a path for the film. The film is moved through the slot, past a longitudinal aperture 10 in the lower block 7 intermittently by any suitable film feeding mechanism. Since such feeding mechanism does not constitute a part of the present invention and would greatly complicate the drawings, it has not been shown.

The hinged aperture member 8 is hingedly attached at its side edge by a hinge pin 12 to the stationary aperture member 7, and is provided with an aperture 13 which is expanded or flared from bottom to top. The member 8 is normally retained in closed position, lying against the stationary member 7 by latch 14. By snapping the latch 14 into open position and rotating the hinged aperture member 8 on the hinge pin 12, the aperture members 7 and 8 can be separated far enough to permit insertion of the film 9 into place. Thereafter, by swinging the hinged aperture member 8 into closed position, the film is locked in place and is ready to be run through the machine.

Film 9, when viewed directly, is illuminated from the rear. To this end there is provided immediately below the stationary aperture member, and to one side of the aperture 10 therein, a lamp 15 which, when illuminated, projects light onto a mirror 16 (Fig. 3a), and thence through an opal screen 17 into and through the aperture 10 onto the film 9. The film 9, being illuminated from the rear, is readily visible from the front side and may be viewed by the operator through a magnifier consisting of a pair of plano-convex lenses 18 which are mounted in a lens barrel 19. As shown in Fig. 2, this lens barrel 19 is hingedly attached, as by a hinge 20, to the hinged aperture member 8 so that the lens barrel 19 can be swung vertically about the hinge 20 under certain conditions of operation to expose the film 9 and permit the operator to make identifying marks thereon.

The apparatus heretofore described corresponds, except for minor changes necessitated by the addition of the screen and projecting equipment, with the direct viewing machines heretofore employed.

Referring now to Fig. 3, when it is desired to project a picture from the film 9 onto the translucent viewing screen 4, the film, instead of being illuminated from the rear, is illuminated from the front. To this end, the lamp 15 is extinguished, the mirror 16 and the opal screen 17 are folded out of the way, and a lamp 21 mounted in a lamp housing 22 adapted to be positioned immediately in front of the lenses 18, is energized.

Referring for the moment to Fig. 12, light from lamp 21 is concentrated by the lenses 18 onto the film 9, thereby illuminating the image 10 (shown as an arrow in Fig. 12) on the film. The light emanating from the film 9 is focused by an objective lens 23 to produce a slightly enlarged inverted image in a plane 25 spaced a distance beyond the focal point 26 of the lens 23. The image produced in the plane 25 is a real inverted image and would be visible if a screen were positioned at that point to receive it. This real image in plane 25 is then projected and again inverted by a concave mirror 27 to produce an enlarged erect image on the translucent screen 4. One viewing the screen 4 will see a projected image similar to, in all respects, except size, the image viewed by looking at the film directly through the magnifying lenses 18 (Fig. 3a).

Referring back to Fig. 3, the objective lens 23 and the concave mirror 27 are all positioned within and supported by the light-tight shadow box 3. When projecting motion pictures, it is desirable to employ a shutter for preventing transmission of light to the screen during the period of movement of the film. To this end a barrel type shutter 29 is disclosed in Fig. 3, it being understood that this shutter will be moved in synchronism with the film moving mechanism in a manner well-known in the art. The details of this mechanism, therefore, need not be described as they do not constitute an essential part of the present invention.

It is desirable to provide for easy and accurate adjustment of the position of the mirror 27. By moving the mirror toward or away from the lens 23, the size of the picture on the screen 4 may be varied between wide limits. The maker can thereby adjust the size of the picture to fit exactly the frame around the screen or may make the picture larger or smaller than the screen according to individual preference of the operator. Such movement of the mirror 27 along the axis of the lens 23 is made possible by the particular mounting of the mirror, next to be described.

Referring to Fig. 11, the mirror 27 is mounted in a rim 30 which is supported on a pair of diametrically opposite trunnions 31 attached to a ring 32 surrounding the rim 30. The ring 32 in turn is provided with a pair of trunnions 33 to be rotatably supported in plates 34, which plates are slidable longitudinally along the upper and lower walls, respectively, of the shadow box 3. These plates 34 (Fig. 4) are positioned across openings 35 in the box and may be locked in any position of longitudinal adjustment by tightening screws 36 extending therethrough into nut members 37, which bear against the opposite face of the wall member 3, closely adjacent the edge of the openings 35. The openings 35 are closed by cover plates 38 to effect a light seal.

It is also desirable to provide accurate swinging adjustment of the mirror 27 about the axis of the trunnions 31 and about the axis of the trunnions 33. To this end the rim 30, to which the mirror 27 is rigidly attached, has extending therefrom on its right side an arm 40 (Fig. 4) which extends upwardly along the right-hand wall of the shadow box to a point adjacent the upper end thereof where it is provided with a longitudinal slot 41 engaged by a pin 42 on a crank 43 mounted on a shaft 44 which extends through the wall of the shadow box and is connected on the exterior of the box to an actuating lever 45 (Fig. 3) having a handle 46 on its upper end, which handle is within convenient reach of an operator seated at the machine. By swinging the lever 45 the crank 43 may be oscillated in either direction to swing the upper end of the arm 40 through a relatively small angle and thereby rotate the rim 30 and the mirror 27 attached thereto, about the trunnions 31.

To effect movement of the mirror about the axis of the trunnions 33, the arm 40 is adapted to be bent intermediate its ends to thereby deflect the end attached to the mirror and cause the rim 30 and the ring 32 to be rotated as a unit about the axis of the trunnions 33.

Thus referring to Fig. 3, the arm 40, at a point a short distance above the mirror 27, is provided with a slot 47 which receives a pin 48 (Fig. 4) on a frame 49, which is rotatably supported on pivots 50 in the upper and lower walls, respectively, of the shadow box. By rotating the frame 49 about the axis of the pivots 50, the pin 48 is moved against one side or the other of the slot 47 in the arm 40 to deflect the latter and oscillate the mirror 27 to obtain accurate and delicate rotary adjustment of the mirror 27.

The frame 49 is provided with an arm 52 (Figs. 3 and 4) which has a longitudinally extending slot 53 in the outer end, in to which projects a pin 54 on a nut member 55. The nut member 55 is threaded onto a screw shaft 56 which is rotatably mounted in a bushing 57 in the wall of the shadow box and is provided exterior of the box with a crank handle 58 whereby it may be rotated. The bushing 57 not only supports the screw 56 for rotation but prevents any longitudinal motion of the screw in the bushing, so that in response to rotation of the crank 58 the nut member 55 is moved back and forth along the screw 56 to shift the pin 54, and through it the arm 52, thereby rotating the frame 49 about the axis of the pivots 50 to shift the pin 48 in one direction or the other to thereby bend the arm 40 and deflect the mirror 27 about the trunnions 33. To prevent rotation of the nut member 55, the latter is provided with an arm 59, the end of which rides between a flange 60 and the arm 52 on the frame 49.

It is quite important to have the handle 46 for effecting vertical movement of the image on the screen 4 within easy reach of the operator, because it is frequently necessary to frame the image following the insertion in the machine of each new film.

In this connection it is to be understood that it is the standard practice in direct viewing machines, to make the hinged aperture member (member 8 in Fig. 3) movable through a limited distance in the direction of movement of the film to permit proper framing of the image irrespective of the particular position of the film when it is inserted. Thus referring to Fig. 2, the aperture 13 in the hinged aperture member 8 is the same size at its inner end as the picture on the film 9, whereas the aperture 10 in the member 7 is substantially larger in the direction of travel of the film than the length of a single picture thereof. Furthermore, the aperture member 8 is slidably mounted for movement in the direction of movement of the film, and may be shifted along the film to secure proper framing of the image by means of a lever 62 (Fig. 7). As shown to best advantage in Fig. 6, the aperture member 8 is slidably mounted on a base member 8a and maintained in frictional engagement with the base 8a by screws 8b (Fig. 6), which screws pass through slots 8c in the base 8a, into the aperture member 8. The member 8 remains in whatever position of adjustment it may be moved to. Obviously when the aperture member 8 is shifted, the entire lamp housing 22 is shifted with it and it then becomes necessary to rotate the mirror 27 about its horizontal axis by means of lever 46 to properly frame the image on the screen 4.

Of course, when the machine is being employed for direct viewing of a film through the magnifying lens 18, the lamp housing 22 is swung out of the way as shown in Figs. 3a and 7, the lamp 15 is illuminated, the lamp 21 is extinguished, and the mirror 16 and opal screen 17 are positioned to illuminate the film from below. To facilitate rapid changeover from the position for direct viewing of the film to the position for projection of the picture on the screen 4, I provide an automatic switch control for the lamps 15 and 21, and an automatic shifting mechanism for the mirror 16 and screen 17.

The switching mechanism is illustrated particularly in Figs. 9 and 10, Fig. 9 showing the positions of the switches when the lamp housing 22 is in closed position, as shown in Figs. 1 and 3, and Fig. 10 showing the positions of the switches when the housing 22 is in the open position shown in Figs. 3a and 7. As shown in Figs. 9 and 10, two switches are employed, one for the lamp 15 and the other for the lamp 21. The switches are both of the mercury type in which a pair of electrodes are sealed into one end of a closed glass tube containing a small quantity of mercury. The switch is opened by moving the tube so that the mercury falls away from the contacts and is closed by shifting the tube so that the mercury flows about and short circuits the contacts. The switches are mounted within the lamp housing 22 in a recess provided therefor, which recess extends below the main chamber of the housing and is segregated therefrom. As shown in Fig. 9, the switch 63, containing a pair of electrodes 64 connected in series with the lamp 15, is so positioned that when the housing 22 is in normal position, the mercury 65 in the tube is in the end of the tube remote from the electrode 64, so that the lamp 15 is extinguished. On the other hand, the switch 66, containing a pair of electrodes 67 connected in series with the lamp 21, is so positioned that the mercury 68 therein short circuits the contacts 67, thereby completing a circuit for energizing the lamp 21.

Referring now to Fig. 10, it will be observed, however, that when the lamp housing 22 is swung into the open position shown in Figs. 3a and 7, the tubes 63 and 66 are shifted so that the mercury in tube 63 short circuits the contacts to energize the lamp 15, whereas the mercury in the tube 66 falls away from the electrodes, thereby opening the latter and extinguishing the lamp 21.

The mechanism for automatically shifting the mirror 16 and the opal screen 17 is illustrated particularly in Figs. 3a, 5 and 8; thus the screen 17 is rigidly secured to the shaft 70, which is rotatably mounted below and to one side of the aperture 10, and has secured thereto a pinion 71 meshing with a rack 72 secured to a plunger 73, which extends upwardly a sufficient distance to be contacted by the lamp housing 22 when the latter is in closed position. To guide the rack 72 and the plunger 73 for longitudinal movement, the plunger 73 is supported in a fixed guide 74, and the rack 72 has attached thereto a guide member 75 positioned between the wall 76 of the casing and the shaft 70 (Figs. 2 and 5).

The rack 72 is normally retracted into an uppermost position as shown in Fig. 3a, by a spring 77 (Fig. 5). In this position the screen 17 extends directly across the aperture 10 to diffuse the light directed into the aperture. The mirror 16 is not rigidly attached to the shaft 70 as is the screen 17, but is hingedly mounted thereon and is adapted to be engaged by a finger 78 projecting from the hinge end of the screen 17. When the screen 17 is in the position directly across the aperture 10, as shown in Fig. 3a, the finger 78 is in engagement with the mirror 16 and supports the latter at an angle of 45° to the screen 17 to reflect light from the lamp 15 through the screen 17 and the aperture 10.

When the lamp housing 22 is moved into the closed position shown in Fig. 1 for causing the picture to be projected onto the screen 4, the housing bears against the outer end of the plunger rod 73 and forces the latter downwardly a sufficient distance to rotate the pinion 71 and the shaft 70 through 90° to carry the screen 17 and the mirror 16 into position clear of the aperture 10, all as clearly shown in Fig. 3. During this operation, movement of the mirror 16 is limited by contact with the frame.

The construction of the apparatus having been described in considerable detail, the operation of the device will now be followed through.

Assume that it is desired to project the picture of a film onto the screen 4. The film is first inserted in the machine by releasing the catch 14 (Figs. 1 and 3) and swinging the hinged aperture member 8 and the lamp housing about the hinge 12 to permit insertion of the film in the channel provided therefor between the members 7 and 8. The member 8 and the lamp housing are then swung into closed position, in which position they are retained by the snap latch 14. The film driving mechanism may then be energized, and since the lamp 21 is automatically energized when the lamp housing is in the closed position, light is projected from lamp 21 through the magnifying lenses 18, which now function as condenser lenses, onto the film 9 illuminating the latter so that an image of the film is projected by the lens 23 and the mirror 27 onto the screen 4. The operator then observes the screen 4 to see if the image is properly framed with respect to the aperture 13. If it is not, he shifts the aperture member 8 by means of the lever 62 until the picture is properly framed with respect to the aperture. The operator next observes the screen 4 to ascertain if the image is properly framed on screen 4, and if it is not, he effects proper framing by shifting the handle 46 to rotate the mirror 27 about its horizontal axis.

If, at any time, while observing the picture on the screen 4, the operator wishes to make identifying marks on the film, he can readily do so by swinging the lamp housing 22 to the left about the hinge-pin 22a, as shown in Fig. 3a, and then rotating the frame 19 carrying the magnifying lenses 18 about the hinge 20 (Fig. 2) to open the upper end of the aperture 13. The operator can then insert a pencil through the aperture 13 and make any desired inscriptions on the film. Of course, in response to movement of the lamp housing 22 into open position, the mirror 16 and screen 17 are automatically thrown into operative position, as shown in Fig. 3a, and the lamp 21 is extinguished and the lamp 15 illuminated so that the film 9 is properly illuminated from the underside while the film is being marked. By merely snapping down the frame 19 and swinging the lamp housing 22 back into closed position, the picture is again porjected on the screen 4.

If it is desired to view the film direct, the operator merely swings the lamp housing 22 into open position, as shown in Fig. 3a, whereupon the lamp 15 is lighted, the lamp 21 extinguished, and the mirror 16 and the screen 17 brought into position, all as previously described.

It is found that when the lenses 18 are properly positioned for desirable magnifying effects (for viewing a film direct), they are also properly positioned for best results as a condensing lens when projecting light from the lamp 21 through the film. It is desirable to provide a concave mirror 80 in the upper end of the lamp housing 22 to increase the illumination of the film with a lamp of the given size.

Changeover from direct viewing to projection on the screen 4 may be made at any time, even without stopping the movement of the film.

Although for purposes of explaining the invention a particular embodiment thereof has been described in some detail, it is to be understood that the invention is not limited to the particular construction described, which may be varied within wide limits to satisfy particular conditions without departing from the invention, the scope of which is set forth in the appended claims.

I claim:

1. A device of the type described, comprising means for supporting a transparency, a source of light positioned rearwardly and laterally with respect to said transparency, a mirror for reflecting light from said source onto said transparency, means for hingedly supporting said mirror for swinging movement from a position directly back of said transparency, in which it reflects light from said source onto said transparency, into a position laterally spaced from said transparency, means for illuminating said transparency from the front, a screen, means positioned directly back of said transparency for projecting an image thereof onto said screen, means for moving said front illuminating means into and out of operative relation in front of said transparency, and means for swinging said mirror between said two positions, said mirror, when in said position directly back of said transparency, being interposed between said transparency and said projecting means, and when in said laterally spaced position being clear of the light path between said transparency and said projecting means.

2. A device of the type described, comprising a frame member including means for supporting and framing a transparency, a converging lens in front of said transparency, means mounting said converging lens for swinging movement in one plane into and out of position in front of said transparency, means for illuminating said transparency from the rear, whereby it can be viewed directly from the front, a screen, means positioned back of said transparency for projecting an image thereof onto said screen, a lamp house containing a lamp, and means mounting said lamp house for swinging movement in a second plane normal to said first plane from a position alined in front of said transparency to a position lateral thereof clear of the path of said swinging lens.

3. A device of the type described, comprising means for supporting a transparency, means comprising an electric lamp for illuminating said transparency from the rear whereby it can be viewed directly from the front, means for illuminating said transparency from the front comprising a lamp housing containing an electric lamp, a screen, means positioned back of said transparency for projecting an image thereof onto said screen when the transparency is illuminated from the front, means mounting said lamp housing for swinging movement into and out of a position in front of said transparency, and switch means actuated in response to movement of said lamp housing for energizing the lamp therein and deenergizing the lamp back of the transparency in response to movement of said housing in front of said transparency, and energizing said lamp back of said transparency in response to movement of said housing from its position in front of said transparency.

4. A device as described in claim 3, in which said switch means is gravity actuated in response to change of positions of said lamp housing.

5. A film-editing device comprising means for supporting a transparency to be viewed, means for illuminating said transparency from the rear, whereby it can be viewed directly from the front; a lamp housing containing a lamp, and means hingedly supporting said lamp housing for swinging movement about an axis parallel to the plane of said transparency from a position directly in front of said transparency, in which it illuminates the latter, into a position laterally displaced from said transparency, leaving the front of the transparency unobstructed; a screen; means positioned back of said transparency for projecting an image thereof onto said screen; and means for moving said rear illuminating means into and out of operative relation back of said transparency in response to movement of said lamp housing, comprising spring means for normally maintaining said illuminating means in operative position, and plunger means actuated by movement of said lamp housing into position directly in front of said transparency for shifting said illuminating means out of operative relation.

6. A device of the type described, comprising means for supporting a motion picture film, means for illuminating said film, a translucent screen positioned adjacent said film, means back of said film for projecting an image of said film on said screen, comprising a mirror positioned a substantial distance behind said screen and mounted for independent rotary movement about two axes at right angles to each other, an elongated member secured to said mirror and extending forwardly therefrom, means guiding the forward end of said member for movement in one plane only to deflect said mirror about one of said axes, means for moving said member in said guide means, and means intermediate the ends of said member for bending it transversely to said plane of guided movement for deflecting said mirror about the other of said axes.

7. A device of the type described, comprising a frame, means on said frame for supporting a transparency, back illuminating means back of the plane of the transparency, means for selectively rendering said back illuminating means operative to illuminate said transparency from the rear, whereby it can be viewed directly from the front, means in front of the plane of the transparency for illuminating said transparency from the front, a screen mounted on said frame, means also supported on said frame and positioned back of said transparency for projecting an image thereof on said screen, means movably mounting said front illuminating means on said frame for movement into and out of operative relation with said transparency, a converging lens positioned in front of said transparency for magnifying the transparency when the latter is viewed from the front through said lens, and for concentrating light from said front illuminating means onto said transparency when an image of the latter is projected onto said screen, and means on said frame for supporting said converging lens independently of said means for movably supporting said front illuminating means.

8. A film-editing device of the type described comprising a frame, means on said frame for supporting a transparency, illuminating means for illuminating said transparency from the front, a translucent screen and means supporting it on said frame in position adjacent to and approximately parallel with said transparency, an optical system for projecting an image of said transparency on said screen comprising a first means for focusing a completely inverted image of said transparency in a plane back of said transparency, and a second means for focusing a completely inverted image of said last-mentioned image onto said screen, whereby the image on said screen is erect both laterally and vertically with respect to the transparency, and means movably supporting said illuminating means on said frame for movement from position directly in front of said transparency to a position laterally disposed with respect thereto and in which said transparency is unobstructed in front, for permitting direct inspection of said transparency from the front.

9. A device of the type described, comprising a frame and means thereon for supporting a transparency, first illuminating means, and means supporting it on said frame for movement from an operative position directly in front of said transparency into an inoperative position laterally displaced from said transparency, a screen supported on said frame, means supported on said frame and positioned back of said transparency for projecting an image of said transparency onto said screen, second illuminating means for illuminating said transparency from the rear and means mounting it on said frame for movement from an operative position between said transparency and said projecting means, in which it directs light on said transparency, into an inoperative position clear of the path between said transparency and said projecting means, and means responsive to movement of said first illuminating means into and out of its said operative position for simultaneously moving said second illuminating means out of and into its operative position.

10. A motion picture film editing machine, comprising a portable frame adapted to be supported upon a floor, a film-moving mechanism mounted on said frame, said mechanism including a film head for framing the film for direct inspection and direct contact in an angularly disposed plane at a height convenient to an operator seated in front of the machine, means including a lamp positioned back of the plane of the film for selectively illuminating it from the rear, means for selectively illuminating said film from the front, including a lamp housing containing a lamp, said housing being movably mounted on said frame for movement from a position directly in front of said film into position laterally displaced therefrom, a translucent screen on said frame positioned substantially at the same height as and parallel to the film in said head but laterally disposed therefrom, focusing and reflecting means behind and below said film head and screen for projecting a laterally and vertically erect image of said film on said screen when the film is illuminated by said front illuminating means, and means for selectively energizing said rear and front illuminating means.

11. A device of the type described, comprising means for supporting a transparency, means for illuminating said transparency from the rear, whereby it can be viewed directly from the front, means for illuminating said transparency from the front, a screen, means positioned back of said transparency for projecting an image thereof on said screen, separate means for moving said two illuminating means into and out of operative relation in back of and in front of said transparency, a converging lens for magnifying the transparency when the latter is viewed directly from the front, means for supporting said lens in position between said transparency and said front illuminating means when the latter is in operative position, whereby it concentrates light from said front illuminating means onto said transparency when an image of the latter is projected onto said screen, said lens-supporting means being independent of the means for supporting said front illuminating means, whereby said front illuminating means is movable into and out of operative relation without consequent movement of said lens into and out of operative relation to said transparency.

IWAN SERRURIER.